US008165191B2

(12) United States Patent
Vijayaraghavan et al.

(10) Patent No.: US 8,165,191 B2
(45) Date of Patent: Apr. 24, 2012

(54) MULTI-PROTOCOL CHANNEL-AGGREGATED CONFIGURABLE TRANSCEIVER IN AN INTEGRATED CIRCUIT

(75) Inventors: Divya Vijayaraghavan, Mountain View, CA (US); Curt Wortman, San Jose, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 755 days.

(21) Appl. No.: 12/288,178

(22) Filed: Oct. 17, 2008

(65) Prior Publication Data

US 2010/0215086 A1    Aug. 26, 2010

(51) Int. Cl.
*H04B 1/38* (2006.01)
*H04L 5/16* (2006.01)

(52) U.S. Cl. ........ 375/222; 375/219; 375/220; 375/259; 710/305; 710/105; 710/315; 370/351; 370/401

(58) Field of Classification Search ................. 375/219, 375/220, 222, 259; 710/305, 105, 315; 370/351, 370/401
See application file for complete search history.

(56) References Cited

U.S. PATENT DOCUMENTS

| | | | |
|---|---|---|---|
| 6,567,653 B1 * | 5/2003 | Sanders | ......................... 455/126 |
| 6,812,870 B1 | 11/2004 | Kryzak et al. | |
| 7,064,685 B1 | 6/2006 | Xue et al. | |
| 7,403,035 B1 | 7/2008 | Shumarayev | |
| 7,538,578 B2 * | 5/2009 | Venkata et al. | .................. 326/41 |
| 2005/0007996 A1 | 1/2005 | Venkata et al. | |

FOREIGN PATENT DOCUMENTS

| | | |
|---|---|---|
| EP | 1248372 | 10/2002 |
| EP | 1715585 | 10/2006 |

OTHER PUBLICATIONS

International Search Report and Written Opinion for App. No. PCT/US2009/059874, dated Apr. 28, 2010, pp. 1-11.
U.S. Appl. No. 12/552,069, filed Sep. 1, 2009, Wortman et al.
U.S. Appl. No. 12/632,744, filed Dec. 7, 2009, Vijayaraghavan et al.
U.S. Appl. No. 12/752,641, filed Apr. 1, 2010, Vijayaraghavan et al.
Frazier, H. "10/100G Ethernet Aggregation at the Physical Layer," Nov. 13, 2007, pp. 1-12.
Green, L. "Lane Bonding Considerations," IEEE 802.3ba Interim Meeting . . . Portland, Jan. 23-25, 2008, pp. 1-14.
Malpass, T. et al. "PBL Model Update," IEEE 802.3 Higher Speed Study Group, Nov. 12-15, 2007, Huawei Technologies Co., Ltd, pp. 1-28.
Nicholl, G. "CTBI: A simple lane bonding mechanism for both 40GE and 100GE Interfaces," Cisco, pp. 1-19.

* cited by examiner

*Primary Examiner* — Phuong Phu
(74) *Attorney, Agent, or Firm* — Mauriel Kapouytian & Treffert LLP; Michael Mauriel

(57) ABSTRACT

Embodiments in the disclosure include a multi-protocol transceiver including a configurable arrangement of receive and/or transmit circuitry. An exemplary transceiver can be selectively configured to effectively transmit and/or receive data communications corresponding to a select one of a plurality of high-speed communication protocols. Another more particular embodiment disclosed includes a configurable data path through link-wide Physical Coding Sub-layer ("PCS") circuitry including link-wide clock compensation, encoding/decoding, and scrambling/descrambling circuitry and lane striping/de-striping circuitry; the configurable data path further includes lane-wide circuitry including clock compensation, encoding/decoding, receive block sync, and Physical Medium Access sub-layer ("PMA") circuitry, and further includes bit muxing/de-muxing circuitry coupled to Physical Medium Dependent ("PMD") sub-layer circuitry.

21 Claims, 3 Drawing Sheets

MULTI-PROTOCOL CHANNEL-AGGREGATED CONFIGURABLE TRANSCEIVER IN AN INTEGRATED CIRCUIT

BACKGROUND

This invention relates generally to the area of system interconnect technology.

As CPU speeds approach the multi-gigahertz range, system designers increasingly focus on system interconnect as the primary bottleneck at the chip-to-chip, board-to-board, backplane and box-to-box levels. System interconnect has evolved from utilizing parallel I/O technology with source-synchronous clocking or system-synchronous clocking to multi-gigabit serial I/O with clock-data recovery ("CDR"). Channel aggregation bonds individual serial I/O lanes to create a multi-lane link, transcending the bandwidth limitations of single transceiver channels and providing the high bandwidth required by next generation serial protocols such as 40/100 Gigabit Ethernet and PCI Express Gen 3. However, various communication protocols have different functional requirements. At the same time, there is an increasing need for system designers to have flexibility in designing systems to work with one particular protocol versus another. Moreover, protocols continue to evolve, so there is a need for transceivers that can be reconfigured to meet the needs of future potential variations in high speed communication protocols. Such protocols may change during the product life of an integrated circuit ("IC"); therefore there is a need for a configurable transceiver design flexible enough to potentially accommodate such changes.

SUMMARY

In one aspect, an embodiment of the present invention includes a multi-protocol transceiver including a configurable arrangement of receive and/or transmit circuitry. The transceiver can be selectively configured to effectively transmit and/or receive data communications corresponding to a select one of a plurality of high-speed communication protocols. Another more particular embodiment of the present invention includes a configurable data path through link-wide Physical Coding Sub-layer ("PCS") circuitry including link-wide clock compensation, encoding/decoding, and scrambling/descrambling circuitry and lane striping/de-striping circuitry; the configurable data path further includes lane-wide circuitry including clock compensation, encoding/decoding, receive block sync, and Physical Medium Access sub-layer ("PMA") circuitry, and further includes bit muxing/de-muxing circuitry coupled to Physical Medium Dependent ("PMD") sub-layer circuitry.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
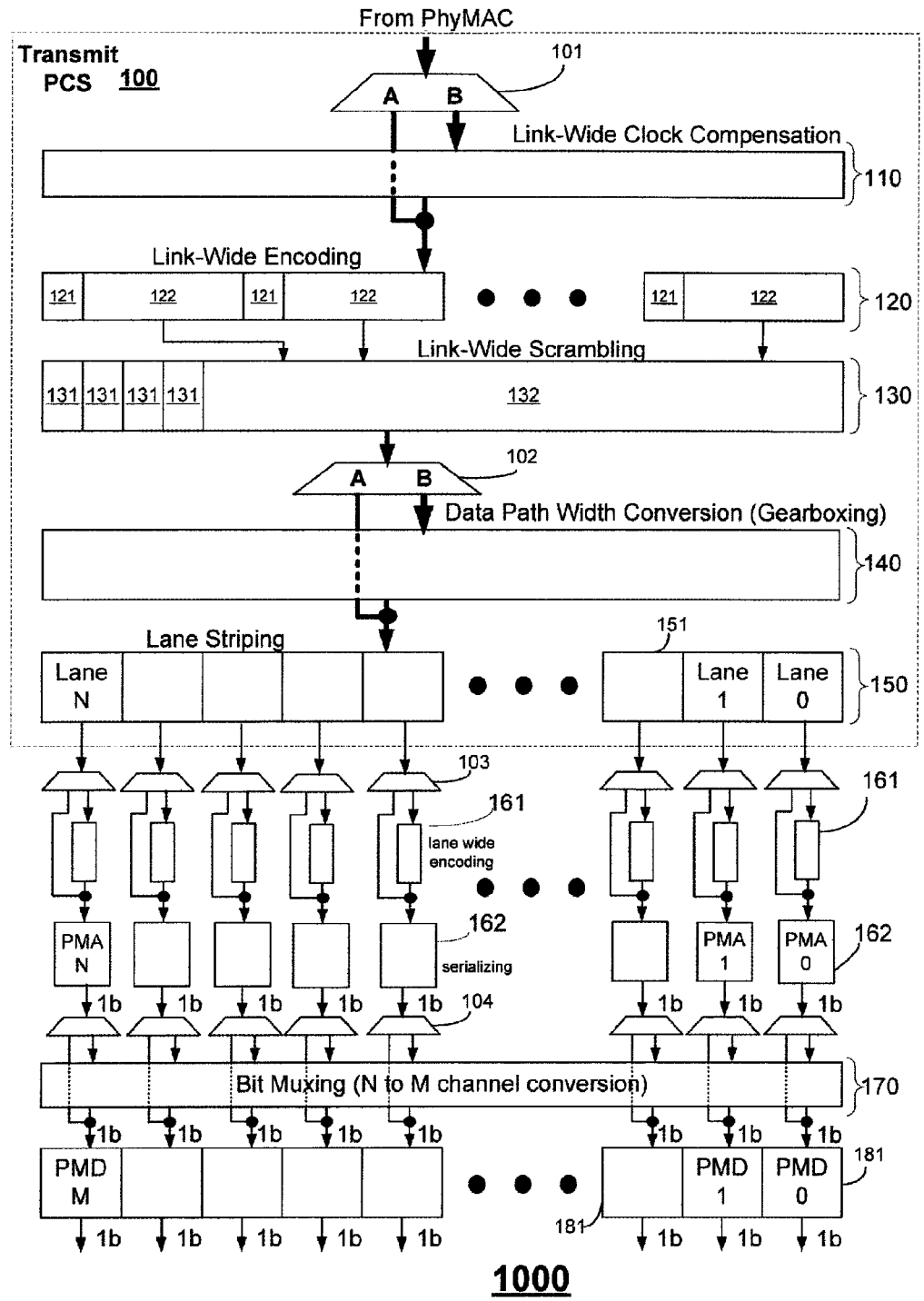
FIG. 1 illustrates Transmit circuitry 1000 in accordance with an exemplary embodiment of the present invention.

FIG. 1 illustrates Transmit circuitry 1000 in accordance with an exemplary embodiment of the present invention. Transmit circuitry 1000 includes Physical Coding Sub-layer ("PCS") circuitry 100. PCS circuitry 100 receives data to be transmitted from Physical Media Access Controller ("PhyMAC") circuitry. PCS circuitry 100 includes Selection circuitry 101, Link-Wide Clock Compensation circuitry 110, Link-Wide Encoding circuitry 120, Link-Wide Scrambling circuitry 130, Selection circuitry 102, Data Path-Width Conversion ("Gearboxing") circuitry 140, and Lane Striping circuitry 150. Link Wide Scrambling Circuitry includes data scrambling circuitry 132 and header processing circuitry 131. Lane striping circuitry 150 includes lane striping sub-circuitry 151 for data lanes 0-N. Transmit circuitry 1000 further includes Selection circuitry 103, Lane Wide Encoding circuitry 161, Physical Medium Access ("PMA") sub-layer circuitry 162 (exemplary circuitry blocks 162 0-N are shown; PMA circuitry 162 serializes the data), Selection circuitry 104, Bit Muxing (N to M channel conversion) circuitry 170, and Physical Medium Dependent ("PMD") sub-layer circuitry 181 (exemplary circuitry blocks 181 0-M are shown). Link-Wide Encoding circuitry 120 includes data processing circuitry 122 and header processing circuitry 121. Link-Wide Encoding circuitry 120 operates on the data and appends appropriate headers to the data.

Transmit circuitry 1000 may be configured differently depending on the communication protocol to which the data transmission must conform. Specifically, for a given application, Selection circuitry 101, 102, 103 and 104 may be configured to selectively bypass (or not bypass) one or more of the following: Link-Wide Clock Compensation circuitry 110, Gearboxing circuitry 140, Lane-Wide Encoding circuitry 161, and Bit Muxing circuitry 170. As one skilled in the art will appreciate, Selection circuitry 101, 102, 103, and 104 may be implemented in a variety of ways. As shown, this circuitry is implemented as demultiplexer circuitry which may be configured to select different outputs depending on whether a functional block is being bypassed in a particular configuration. If Link-Wide Clock Compensation circuitry 110 is to be bypassed, Selection circuitry 101 would be configured to deselect output B and select output A. Conversely, if Link-Wide Clock Compensation Circuitry 110 is to be utilized, Selection circuitry 101 would be configured to deselect output A and select output B. Those skilled in the art will appreciate that similar configuration choices regarding Selection circuitry 102 can be made to either bypass or not bypass Gearboxing circuitry 140. In like fashion, Selection circuitry 103 can be configured to either bypass or not bypass Lane-Wide Encoding circuitry 161. Similarly, Selection circuitry 104 can be configured to either bypass or not bypass Bit Muxing circuitry 170. One skilled in the art will also appreciate that in alternative embodiments, configurable bypass may be implemented with multiplexer circuitry rather than demultiplexer circuitry. For example, a multiplexer may be used to select input from either a bypassable block or a block prior to the by-passable block.

By way of example, Transmit circuitry 1000 might be configured to effectively operate with the PCI Express Gen 3 protocol in the following manner. Selection circuitry 101 would be configured to bypass Link-Wide Clock Compensation circuitry 110. Selection circuitry 102 would be configured to not bypass Gearboxing circuitry 140. Selection circuitry 103 would be configured to not bypass lane wide encoding circuitry 161. And Selection circuitry 104 would be configured to bypass Bit Muxing circuitry 170.

By way of another example, Transmit circuitry 1000 might be configured to effectively operate with the 40/100 Gigabit Ethernet protocol in the following manner. Selection circuitry 101 would be configured to not bypass Link-Wide Clock Compensation circuitry 110. Selection circuitry 102 would be configured to not bypass Gearboxing circuitry 140. Selection circuitry 103 would be configured to bypass lane wide encoding circuitry 161. And Selection circuitry 104 would be configured to not bypass Bit Muxing circuitry 170.

Figure 2:
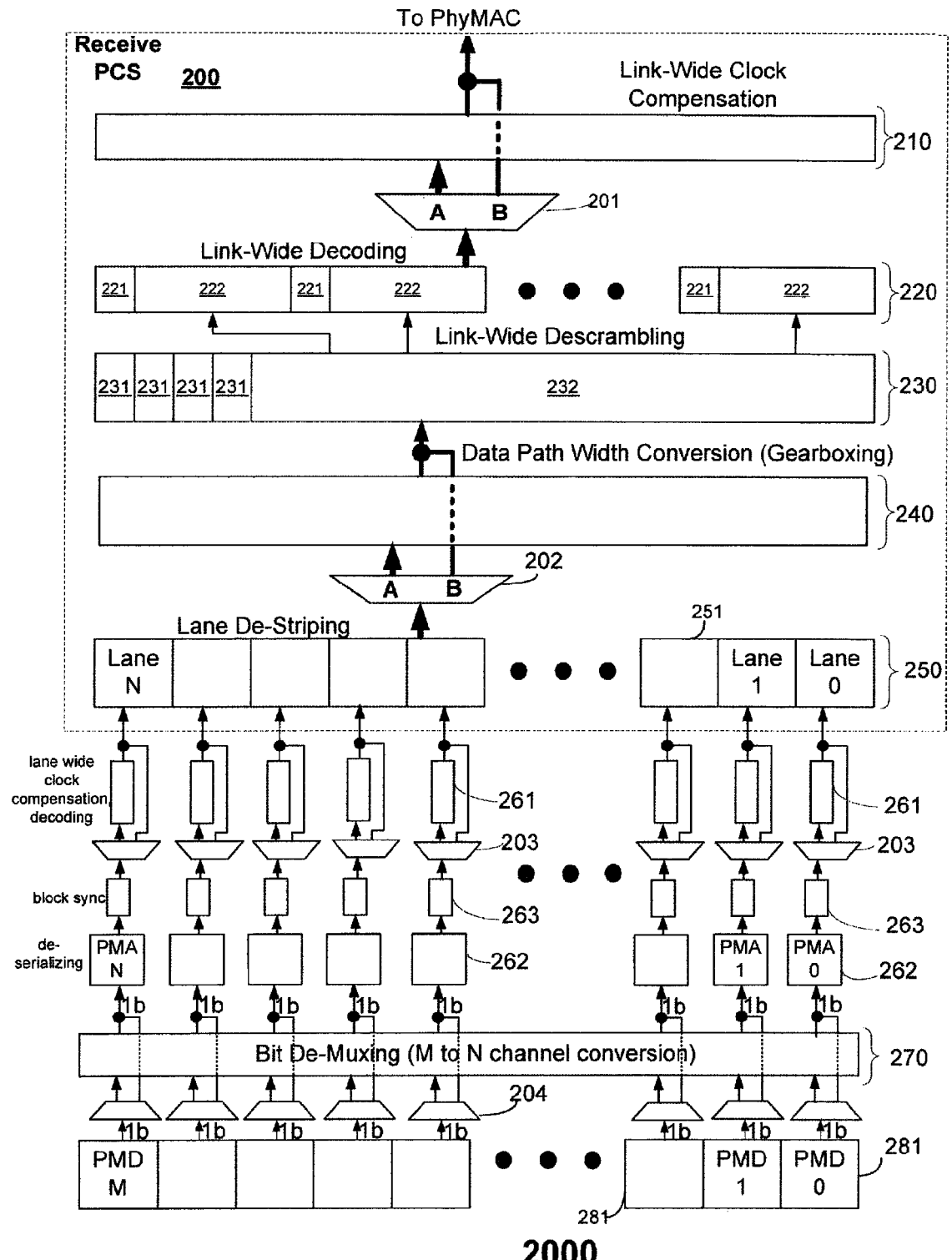
FIG. 2 illustrates Receive circuitry 2000 in accordance with an exemplary embodiment of the present invention.

FIG. 2 illustrates Receive circuitry 2000 in accordance with an exemplary embodiment of the present invention. Receive circuitry 2000 includes Physical Coding Sub-layer ("PCS") receive circuitry 200. PCS circuitry 200 includes Selection circuitry 201, Link-Wide Clock Compensation circuitry 210, Link-Wide Decoding circuitry 220, Link-Wide Self Synchronizing Descrambling circuitry 230, Selection circuitry 202, Data Path Width Conversion ("Gearboxing") circuitry 240, and Lane De-Striping circuitry 250. Link-Wide Descrambling circuitry includes data descrambling circuitry 232 and header processing circuitry 231. Lane De-Striping circuitry 250 includes lane de-striping sub-circuitry 251 for data lanes 0-N. Receive circuitry 2000 further includes Lane-Wide Clock Compensation and Decoding Circuitry 261, Selection circuitry 203, Block Sync circuitry 263, Physical Medium Access ("PMA") sub-layer circuitry 262 (exemplary PMA circuitry blocks 0-N are shown; PMA circuitry 262 de-serializes the data), Bit De-Muxing (M to N channel conversion) circuitry 270, Selection circuitry 204 and Physical Medium Dependent ("PMD") sub-layer circuitry 281 (exemplary circuitry blocks 281 0-M are shown). Link-Wide Decoding circuitry 220 includes data processing circuitry 222 and header processing circuitry 221. Link-Wide Decoding circuitry 220 operates on the data and removes headers from the data.

Receive circuitry 2000 may be configured differently depending on the communication protocol to which the data transmission must conform. Specifically, for a given application, Selection circuitry 201, 202, 203, and 204 may be configured to selectively bypass (or not bypass) one or more of the following: Link-Wide Clock Compensation circuitry 210, Gearboxing circuitry 240, Lane Wide Clock Compensation and Decoding circuitry 261, and Bit De-Muxing circuitry 270. As one skilled in the art will appreciate, Selection circuitry 201, 202, 203 and 204 may be implemented in a variety of ways. As shown, this circuitry is implemented as demultiplexer circuitry which may be configured to select different outputs depending on whether a functional block is being bypassed in a particular configuration. If Link-Wide Clock Compensation circuitry 210 is to be bypassed, Selection circuitry 201 would be configured to deselect output A and select output B. Conversely, if Link-Wide Clock. Compensation circuitry 210 is to be utilized, Selection circuitry 201 would be configured to deselect output B and select output A. Those skilled in the art will appreciate that similar configuration choices regarding Selection circuitry 202 can be made to either bypass or not bypass Gearboxing circuitry 240. Similarly, Selection circuitry 203 may be configured to either bypass or not bypass Lane Wide Clock Compensation and Decoding Circuitry 261. Also, Selection circuitry 204 may be configured to either bypass or not bypass Bit De-Muxing circuitry 270. One skilled in the art will also appreciate that in alternative embodiments, configurable bypass may be implemented with multiplexer circuitry rather than demultiplexer circuitry. For example, a multiplexer may be used to select input from either a bypassable block or a block prior to the bypassable block.

By way of example, Receive circuitry 2000 might be configured to effectively operate with the PCI Express Gen 3 protocol in the following manner. Selection circuitry 204 would be configured to bypass Bit De-Muxing circuitry 270. Selection circuitry 203 would be configured to not bypass Lane-Wide Clock Compensation and Decoding circuitry 261. Selection circuitry 202 would be configured to not bypass Data Path Width Conversion circuitry 240. And Selection circuitry 201 would be configured to not bypass Link-Wide Clock Compensation circuitry 210.

By way of another example, Receive circuitry 2000 might be configured to effectively operate with the 40/100 Gigabit Ethernet protocol in the following manner. Selection circuitry 204 would be configured to not bypass Bit De-Muxing circuitry 270. Selection circuitry 203 would be configured to bypass Lane-Wide Clock Compensation and Decoding circuitry 261. Selection circuitry 202 would be configured to not bypass Data Path-Width Conversion circuitry 240. And Selection circuitry 201 would be configured to not bypass Link-Wide Clock Compensation circuitry 210.

Transmit circuitry 1000, shown in FIG. 1, and Receive Circuitry 2000, shown in FIG. 2, may be implemented as part of a transceiver in any IC that supports transceiver configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Transceiver configuration may also be accomplished via one or more externally generated signals received by the IC during operation of the IC. Data represented by such signals may or may not be stored on the IC during operation of the IC. Transceiver configuration may also be accomplished via mask programming during fabrication of the IC. While mask programming may have disadvantages relative to some of the field programmable options already listed, it may be useful in certain high volume applications.

A specific example of an IC that supports transceiver configuration is a programmable logic device ("PLD"). PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways.

Figure 3:
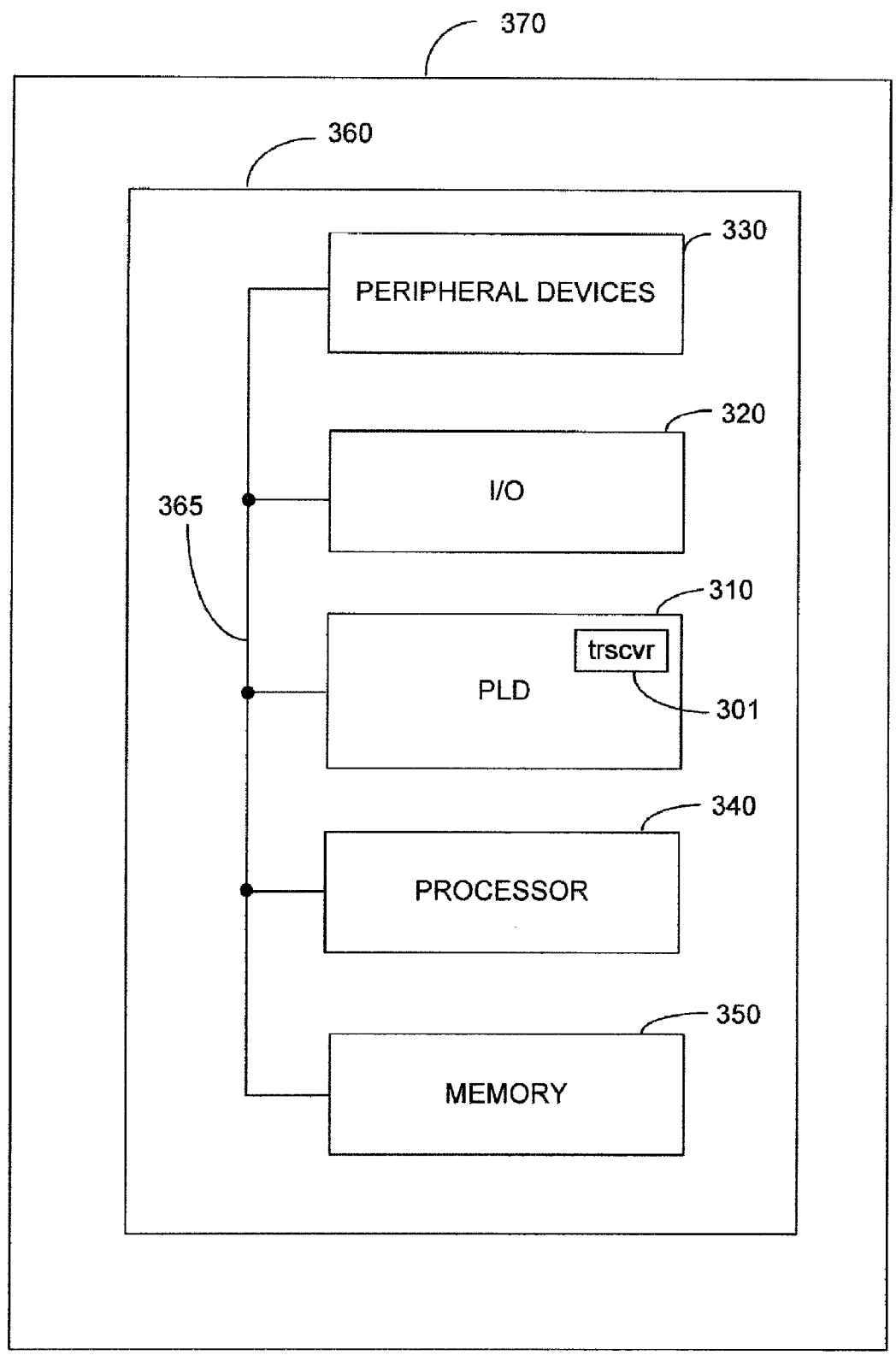
FIG. 3 illustrates an exemplary data processing system 300 including a Programmable Logic Device ("PLD") 310. PLD 310 includes transceiver 301. Transceiver 301 includes transmit and receive circuitry in accordance with embodiments of the present invention such as those illustrated in FIG. 1 and FIG. 2.

FIG. 3 illustrates an exemplary data processing system 300 including a PLD 310. PLD 310 includes transceiver 301. For ease of illustration, only a single transceiver is shown, however, a PLD such as PLD 310 may include multiple transceivers 301. Transceiver 301 includes transmit and receive circuitry in accordance with embodiments of the present invention such as, for example, Transmit circuitry 1000, shown in FIG. 1, and Receive circuitry 2000, shown in FIG. 2.

Data processing system 300 may include one or more of the following additional components: processor 340, memory 350, input/output (I/O) circuitry 320, and peripheral devices 330 and/or other components. These components are coupled together by system bus 365 and are populated on circuit board 360 which is contained in end-user system 370. A data processing system such as system 300 may include a single end-user system such as end-user system 370 or may include a plurality of systems working together as a data processing system.

System 300 can be used in a wide variety of applications, such as computer networking, data networking, instrumentation, video processing, digital signal processing, or any other application where the advantage of using programmable or reprogrammable logic in system design is desirable. PLD 310 can be used to perform a variety of different logic functions. For example, PLD 310 can be configured as a processor or controller that works in cooperation with processor 340 (or, in alternative embodiments, a PLD might itself act as the sole system processor). PLD 310 may also be used as an arbiter for arbitrating access to shared resources in system 300. In yet another example, PLD 310 can be configured as an interface between processor 340 and one of the other components in system 300. It should be noted that system 300 is only exemplary.

In one embodiment, system 300 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. A configurable transceiver comprising:
a plurality of data processing circuitry blocks including at least some circuitry blocks corresponding to Physical Coding Sublayer ("PCS") circuitry; and
configurable selection circuitry coupled between at least some of the data processing circuitry blocks, the selection circuitry being configurable to either bypass or enable one or more link-wide data processing circuitry blocks and one or more lane-wide data processing circuitry blocks in a data path of the transceiver such that the transceiver is configurable to accommodate data communication using a select one of a plurality of high speed communication protocols, wherein a lane-wide data processing circuitry block of the one or more lane-wide data processing circuitry blocks is adapted to process a subset of data processed by a link-wide data processing circuitry block of the one or more link-wide data processing circuitry blocks.

2. The configurable transceiver of claim 1 wherein the plurality of communication protocols includes the 40/100 Gigabit Ethernet protocol.

3. The configurable transceiver of claim 2 wherein the plurality of communication protocols includes the PCI Express Gen 3 protocol.

4. The configurable transceiver of claim 1 wherein the plurality of data processing circuitry blocks include transmit circuitry, the transmit circuitry including at least:
link-wide clock compensation circuitry coupled to Physical Media Access Controller ("PhyMAC") circuitry;
link-wide encoding circuitry coupled to the link-wide clock compensation circuitry;
link-wide scrambling circuitry coupled to the link-wide encoding circuitry;
data path-width conversion circuitry coupled to the link-wide scrambling circuitry;
lane striping circuitry coupled to the data path-width conversion circuitry;
first configurable selection circuitry coupled to the PhyMAC circuitry, the link-wide clock compensation circuitry, and to the link-wide encoding circuitry such that the first configurable selection circuitry can be configured to bypass or not bypass the link-wide clock compensation circuitry in a data path of the transmit circuitry; and
second configurable selection circuitry coupled to the link-wide scrambling circuitry, the data path-width conversion circuitry, and to the lane striping circuitry such that the second configurable selection circuitry can be configured to bypass or not bypass the data path-width conversion circuitry in a data path of the transmit circuitry.

5. The configurable transceiver of claim 4 wherein the transmit circuitry further includes at least:
lane-wide encoding circuitry coupled to the lane striping circuitry;
serializing circuitry coupled to the lane-wide encoding circuitry;
bit muxing (N to M channel conversion) circuitry coupled to the serializing circuitry;
third configurable selection circuitry coupled to the lane striping circuitry, the lane-wide encoding circuitry, and to the serializing circuitry such that the third configurable selection circuitry can be configured to bypass or not bypass the lane-wide encoding circuitry in a data path of the transmit circuitry; and
fourth configurable selection circuitry coupled to the serializing circuitry, the bit muxing circuitry, and to Physical Medium Dependent ("PMD") circuitry such that the fourth configurable selection circuitry can be configured to bypass or not bypass the bit muxing circuitry in a data path of the transmit circuitry.

6. The configurable transceiver of claim 5 wherein the first, second, third, and fourth configurable selection circuitry comprises demultiplexers.

7. The configurable transceiver of claim 5 wherein the first, second, third, and fourth configurable selection circuitry comprises multiplexers.

8. The configurable transceiver of claim 1 wherein the plurality of data processing circuitry blocks include receive circuitry, the receive circuitry including at least:
link-wide clock compensation circuitry coupled to Physical Media Access Controller ("PhyMAC") circuitry;
link-wide decoding circuitry coupled to the clock compensation circuitry;
link-wide descrambling circuitry coupled to the link-wide decoding circuitry;
data path-width conversion circuitry coupled to the link-wide descrambling circuitry;

lane de-striping circuitry coupled to the data path-width conversion circuitry;

first configurable selection circuitry coupled to the Phy-MAC circuitry, the link-wide clock compensation circuitry, and to the link-wide decoding circuitry such that the configurable selection circuitry can be configured to bypass or not bypass the clock compensation circuitry in a data path of the receive circuitry; and second configurable selection circuitry coupled to the link-wide descrambling circuitry, the data path-width conversion circuitry and to the lane de-striping circuitry such that the second configurable selection circuitry can be configured to bypass or not bypass the data path-width conversion circuitry in a data path of the receive circuitry.

9. The configurable transceiver of claim 8 wherein the receive circuitry further includes at least:

lane-wide clock compensation and decoding circuitry coupled to the lane de-striping circuitry; block sync circuitry coupled to the lane-wide clock compensation and decoding circuitry;

de-serializing circuitry coupled to the lane-wide encoding circuitry;

bit de-muxing (M to N channel conversion) circuitry coupled to the de-serializing circuitry;

third configurable selection circuitry coupled to the lane de-striping circuitry, the lane-wide clock compensation and decoding circuitry, and to the block sync circuitry such that the third configurable selection circuitry can be configured to bypass or not bypass the lane-wide decoding circuitry in a data path of the receive circuitry; and fourth configurable selection circuitry coupled to the de-serializing circuitry, the bit de-muxing circuitry and to Physical Medium Dependent ("PMD") circuitry such that the fourth configurable selection circuitry can be configured to bypass or not bypass the bit de-muxing circuitry in a data path of the receive circuitry.

10. The configurable transceiver of claim 9 wherein the first, second, third, and fourth configurable selection circuitry comprises demultiplexers.

11. The configurable transceiver of claim 9 wherein the first, second, third, and fourth configurable selection circuitry comprises multiplexers.

12. A programmable logic device comprising the configurable transceiver of claim 1.

13. A programmable logic device comprising the configurable transceiver of claim 5.

14. A programmable logic device comprising the configurable transceiver of claim 9.

15. A method of configuring a configurable transceiver comprising:

selecting a communication protocol for which the transceiver is to be configured;

identifying first by-passable circuitry of the transceiver that should be bypassed when using the transceiver with the selected communication protocol, the first bypassable circuitry including at least one data processing circuitry block;

identifying second by-passable circuitry of the transceiver that should not be bypassed when using the transceiver with the selected communication protocol, the second bypassable circuitry including a plurality of independently bypassable data processing circuitry blocks; and configuring the transceiver such that a data path of the transceiver bypasses the first by-passable circuitry and does not by-pass the second by-passable circuitry, wherein the communication protocol for which the transceiver is to be configured is the 40/100 Gigabit Ethernet protocol and configuring the transceiver includes configuring transmit circuitry of the transceiver by configuring selection circuitry to not bypass link-wide clock compensation circuitry, data path-width conversion circuitry, and bit-muxing (N to M channel conversion) circuitry and to bypass lane wide encoding circuitry.

16. A method of configuring a configurable transceiver comprising:

selecting a communication protocol for which the transceiver is to be configured;

identifying first by-passable circuitry of the transceiver that should be bypassed when using the transceiver with the selected communication protocol, the first bypassable circuitry including at least one data processing circuitry block;

identifying second by-passable circuitry of the transceiver that should not be bypassed when using the transceiver with the selected communication protocol, the second bypassable circuitry including a plurality of independently bypassable data processing circuitry blocks; and configuring the transceiver such that a data path of the transceiver bypasses the first by-passable circuitry and does not by-pass the second by-passable circuitry, wherein the communication protocol for which the transceiver is to be configured is the 40/100 Gigabit Ethernet protocol and configuring the transceiver includes configuring receive circuitry of the transceiver by configuring selection circuitry to not bypass bit de-muxing (M to N channel conversion) circuitry, data path-width conversion circuitry, and clock compensation circuitry and to bypass lane-wide clock compensation and decoding circuitry.

17. A method of configuring a configurable transceiver comprising:

selecting a communication protocol for which the transceiver is to be configured;

identifying first by-passable circuitry of the transceiver that should be bypassed when using the transceiver with the selected communication protocol, the first bypassable circuitry including at least one data processing circuitry block;

identifying second by-passable circuitry of the transceiver that should not be bypassed when using the transceiver with the selected communication protocol, the second bypassable circuitry including a plurality of independently bypassable data processing circuitry blocks; and configuring the transceiver such that a data path of the transceiver bypasses the first by-passable circuitry and does not by-pass the second by-passable circuitry, wherein the communication protocol for which the transceiver is to be configured is the PCI Express Gen 3 protocol and configuring the transceiver includes configuring transmit circuitry of the transceiver by configuring selection circuitry to not bypass data path-width conversion circuitry and lane-wide encoding circuitry and to bypass clock compensation circuitry and bit muxing (N to M channel conversion) circuitry.

18. A method of configuring a configurable transceiver comprising:

selecting a communication protocol for which the transceiver is to be configured;

identifying first by-passable circuitry of the transceiver that should be bypassed when using the transceiver with the selected communication protocol, the first bypassable circuitry including at least one data processing circuitry block;

identifying second by-passable circuitry of the transceiver that should not be bypassed when using the transceiver with the selected communication protocol, the second bypassable circuitry including a plurality of independently bypassable data processing circuitry blocks; and configuring the transceiver such that a data path of the transceiver bypasses the first by-passable circuitry and does not by-pass the second by-passable circuitry, wherein the communication protocol for which the transceiver is to be configured is the PCI Express Gen 3 protocol and configuring the transceiver includes configuring receive circuitry of the transceiver by configuring selection circuitry to not bypass link-wide clock compensation circuitry, data path-width conversion circuitry, and lane-wide clock compensation and decoding circuitry and to bypass bit de-muxing (M to N channel conversion) circuitry.

19. A configurable data path in a transceiver comprising:

a plurality of data processing means for processing data in accordance with a selected high-speed communication protocol;

means for configuring the data path to either enable or bypass at least one of the plurality-of data processing means in the data path.

20. The configurable data path of claim 19 wherein the plurality of data processing means includes at least one means for link-wide data processing and at least one means for lane-wide data processing.

21. The configurable data path of claim 20 wherein the means for configuring the data path are configurable to either bypass or enable at least one means for link-wide data processing and to either bypass or enable at least one means for lane-wide data processing.

* * * * *